US 11,249,475 B2

(12) United States Patent
Li et al.

(10) Patent No.: US 11,249,475 B2
(45) Date of Patent: Feb. 15, 2022

(54) METHOD AND SYSTEM FOR PRESENTING TRAJECTORY OF ROBOT AND ENVIRONMENTAL MAP

(71) Applicant: Shenzhen Xiluo Robot Co., Ltd., Guangdong (CN)

(72) Inventors: Yan Li, Guangdong (CN); Zhangjun Song, Guangdong (CN); Hongtao Wang, Guangdong (CN)

(73) Assignee: Shenzhen Xiluo Robot Co., Ltd., Shenzhen (CN)

( * ) Notice: Subject to any disclaimer, the term of this patent is extended or adjusted under 35 U.S.C. 154(b) by 615 days.

(21) Appl. No.: 16/219,913

(22) Filed: Dec. 13, 2018

(65) Prior Publication Data
US 2019/0286122 A1    Sep. 19, 2019

(30) Foreign Application Priority Data

Mar. 19, 2018 (CN) .......................... 201810223667.6

(51) Int. Cl.
*G01C 22/00* (2006.01)
*G05D 1/00* (2006.01)
*G05D 1/02* (2020.01)

(52) U.S. Cl.
CPC ......... *G05D 1/0044* (2013.01); *G05D 1/0238* (2013.01); *G05D 1/0251* (2013.01)

(58) Field of Classification Search
CPC ... G05D 1/0044; G05D 1/0238; G05D 1/0251
See application file for complete search history.

(56) References Cited

U.S. PATENT DOCUMENTS

| 9,389,085 | B2* | 7/2016 | Khorashadi | ............ G01C 21/20 |
| 2010/0148977 | A1 | 6/2010 | Tseng et al. | |
| 2018/0113459 | A1* | 4/2018 | Bennie | .................. G05D 1/028 |
| 2018/0306589 | A1* | 10/2018 | Holz | ...................... G01S 17/87 |

FOREIGN PATENT DOCUMENTS

| CN | 102866706 A | 1/2013 |
| CN | 104858871 A | 8/2015 |
| CN | 105147199 A | 12/2015 |
| CN | 106289285 A | 1/2017 |

(Continued)

OTHER PUBLICATIONS

Junfeng Dong, Research on Human Motion Analysis Based on Vision, Aug. 15, 2015, pp. 6-22.

(Continued)

*Primary Examiner* — Adam M Alharbi

(57) ABSTRACT

Provided are a method and a system for presenting a trajectory of a robot and an environmental map, where environmental map data and data of trajectory of movement of the robot which are created by the robot are acquired by a user terminal, and further the environmental map is displayed as a background and the trajectory is displayed as a foreground on the user terminal, and the trajectory is refreshed at a frequency greater than that of the environment map, thereby solving the problem that the trajectory is updated slowly and cannot be displayed in real time with a lag, thereby improving the user experience.

9 Claims, 3 Drawing Sheets

(56) References Cited

FOREIGN PATENT DOCUMENTS

CN            106774338 A      5/2017
CN            107744371 A      3/2018

OTHER PUBLICATIONS

Shuheng Wu, Vision-Based Outdoor Mobile Robot Road Understanding and Path Planning, Jul. 15, 2005, pp. 7-59.
First Office Action of Counterpart Chinese Patent Application No. 201810223667.6 dated May 6, 2020.
Second Office Action of Counterpart Chinese Patent Application No. 201810223667.6 dated Aug. 7, 2020.
Third Office Action of Counterpart Chinese Patent Application No. 201810223667.6 dated Feb. 22, 2021.
First search of Counterpart Chinese Patent Application No. 201810223667.6.
Supplementary search of Counterpart Chinese Patent Application No. 201810223667.6.

\* cited by examiner

| Acquiring, by a user terminal, environmental map data and data on trajectory of movement of the robot which are created by the robot | — S30 |

| Displaying the environmental map as a background and the trajectory as a foreground on the user terminal, the trajectory being refreshed at a frequency greater than that of the environmental map | — S50 |

METHOD AND SYSTEM FOR PRESENTING TRAJECTORY OF ROBOT AND ENVIRONMENTAL MAP

CROSS-REFERENCE TO RELATED APPLICATIONS

This application claims priority to Chinese Patent Application No. 201810223667.6, filed on Mar. 19, 2018, entitled "Method and System for Presenting Trajectory of Robot and Environmental Map", which is incorporated herein by reference in its entirety.

TECHNICAL FIELD

The present disclosure relates to the technical field of map data processing, and in particular to a method and system for presenting a trajectory of a robot and an environmental map.

BACKGROUND ART

With the improvement of people's living standards and the acceleration of the pace of life, more and more middle-class people want to be freed from the heavy work of room cleaning, and they usually choose to buy cleaning robots to help them solve the problem of daily room cleaning. With the popularization of smart phones and tablets, the smart phones, tablets, or the like are used, more and more in the market, for controlling cleaning robots, and for presenting information such as the trajectory of the cleaning robot and the established environmental map.

In the prior art, data of the environmental map and the trajectory are concluded in the same map data, since the data amount of the environmental map is large and has a relatively large upload delay, the trajectory is updated slowly with a lag, and cannot be displayed in real time by a smartphone, a tablet, or the like, which affects the user experience.

BRIEF DESCRIPTION OF DRAWINGS

In order to more clearly illustrate the technical solutions of the examples of the present disclosure or in the prior art, brief description is made below on the drawings required to be used in the description of the examples or the prior art. Obviously, the drawings in the following description only illustrate some of the examples of the present disclosure, and for those of ordinary skills in the art, other variations may be obtained from these drawings without inventive efforts.

DETAILED DESCRIPTION OF EMBODIMENTS

The technical solutions in examples of the present disclosure are clearly described below with reference to the drawings in examples of the present disclosure. Apparently, the described examples are merely some of the embodiments of the present disclosure, rather than all the examples. Based on the examples in the present disclosure, all the other examples obtained by those of ordinary skills in the art without inventive efforts shall be covered by the protection scope of the present disclosure.

Figure 1:
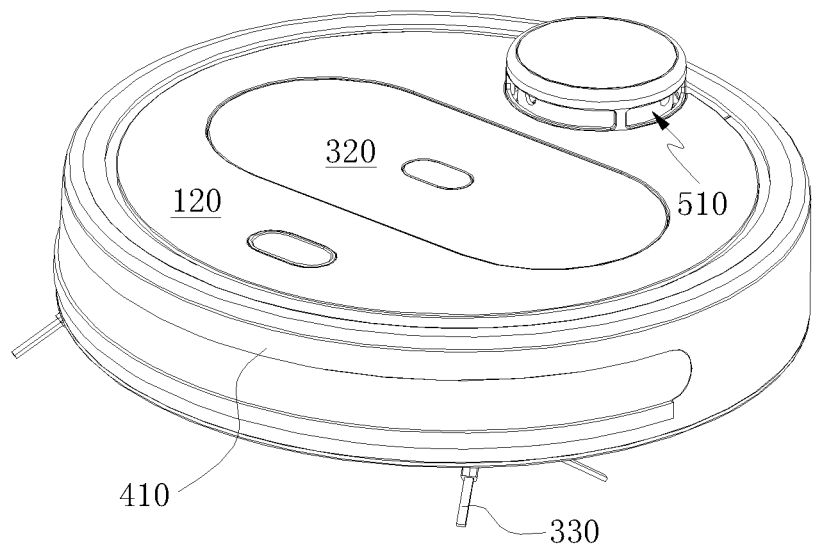
FIG. 1 is a schematic structural diagram of a robot.
Figure 2:
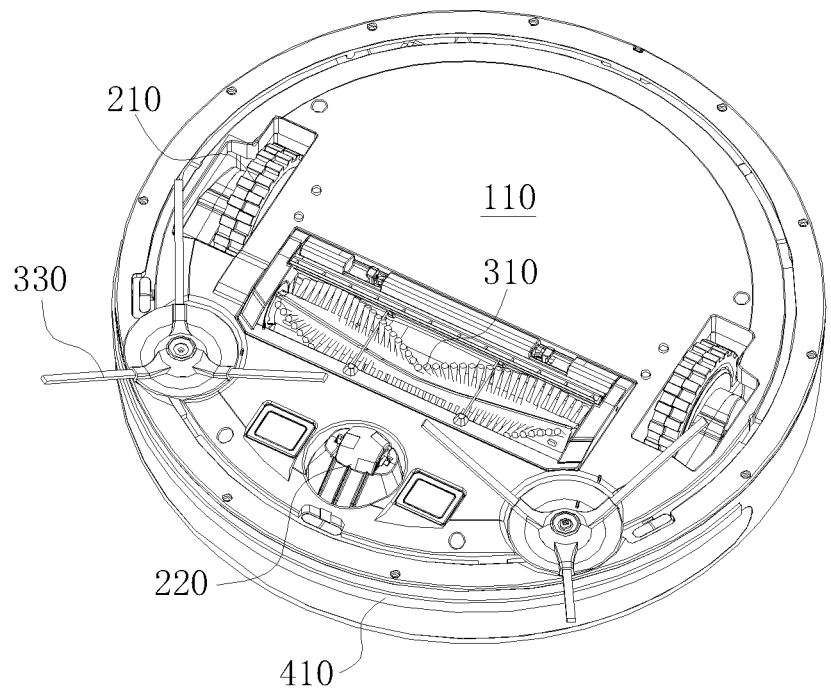
FIG. 2 is a schematic diagram of a bottom structure of the robot shown in FIG. 1.

As shown in FIG. 1 and FIG. 2, FIG. 1 is a schematic structural diagram of a robot 10, and FIG. 2 is a schematic diagram of a bottom structure of the robot 10 shown in FIG. 1. Specifically, in the present embodiment, the robot 10 is a cleaning robot, and in other embodiments, the robot 10 may also be a care-giving robot, a guest-guiding robot, a remotely controlled camera robot, or the like.

The robot 10 comprises a body which may comprise a chassis 110 and an upper cover 120, where the upper cover 120 is detachably mounted to the chassis 110 to protect various functional components inside the robot 10 from damage by an intense impact or an inadvertently spilled liquid, during use; and the chassis 110 and/or the upper cover 120 are used for carrying and supporting the various functional components. In an optional embodiment, the body of the robot 10 may also be of other design configurations, for example, the body has an integrally formed structure, or a structure with left and right parts disposed separately, and the material, shape, structure, and so on of the body are not limited in the embodiment of the present disclosure.

The robot 10 comprises a drive system which is connected to the body and configured to drive the robot 10 to move on the ground, for example, the robot 10 may be designed to autonomously plan a path on the ground, or may also be designed to move on the ground responding to a remote control instruction. In an embodiment of the present disclosure, the drive system comprises two wheels 210, at least one universal wheel 220, and a motor for driving a rotation of the wheels 210, wherein the wheels 210 and the universal wheel 220 protrude at least partially from the bottom of the chassis 110, and for example, the two wheels 210 may be partially hidden in the chassis 110 under the weight of the robot 10 itself. In an optional embodiment, the drive system may also include any one of a triangular crawler wheel, a Mecanum wheel, and the like.

The robot 10 may further comprise a sweeping system, for example, the sweeping system includes one or both of a middle sweeping bristle brush 310 and a middle sweeping rubber brush, the middle sweeping bristle brush 310 and the middle sweeping rubber brush are adapted to be disposed in a receiving groove provided at the bottom of the chassis 110, and the receiving groove is provided with a dust suction port, which communicates with a dust collecting box 320 and a dust suction fan so that dust and garbage on the ground are stirred up when the middle sweeping bristle brush 310 is rotated, and a suction force is generated by using the dust suction fan to suck the dust and garbage from the dust suction port into the dust collecting box 320. In addition to being provided with the middle sweeping bristle brush 310 and/or the middle sweeping rubber brush, the robot 10 may also contain an edge sweeper 330, and the edge sweeper 330 has a sweeping coverage area extending beyond the range of an outer contour of the body, which is advantageous to effective sweeping of wall edges, corners, and edges of obstacles.

The robot 10 may further comprise a mopping system, for example, the mopping system comprises a water storage tank, a rag, etc., and the water storage tank may be disposed separately from or designed integrally with the dust collecting box 320. In an optional embodiment, water in the water storage tank is sucked by a water suction pump and uniformly dripped onto the rag, and the ground is wiped with the wet rag when the robot 10 is moving on the ground. In an optional embodiment, the water in the water storage tank is atomized by an atomizer such that water mist is formed and sprayed to the ground, and then the ground sprayed by the water mist is wiped with the rag.

The robot 10 may further comprise a collision sensing device which is formed on at least a part of an outer periphery of the body. In an embodiment of the present disclosure, the collision sensing device comprises a collision part 410 surrounding the outer periphery of the body, and a sensor and an elastic mechanism disposed between the body and the collision part 410. The arrangement of the elastic mechanism and the sensor between the collision part 410 and the body includes, but is not limited to, the following cases: 1) the elastic mechanism and the sensor are located between the collision part 410 and the body; 2) the elastic mechanism and/or the sensor is mounted on the body, but a portion of the elastic mechanism and/or the sensor is located between the collision part 410 and the body; 3) the elastic mechanism and/or the sensor is mounted on the collision part 410, but a portion of the elastic mechanism and/or the sensor is located between the collision part 410 and the body; and 4) the elastic mechanism and/or the sensor is mounted on the collision part 410 and the body. The elastic mechanism is used for maintaining a uniform movement gap between the collision part 410 and the body, and the sensor is used for sensing a relative displacement between the collision part 410 and the body. The sensor may be any one or more of a micro switch, a Hall switch, an infrared photoelectric switch, etc., and a plurality of sensors may be disposed between the body and the collision part 410, for example, at least one sensor is distributed between the body and the collision part 410 at each of locations at the front and both sides of the robot 10. The sensor is usually electrically connected to a certain controller, processor or control system (not shown) on the robot 10 to facilitate capturing of data from the sensor so as to control the robot 10 to make a corresponding action. Since the collision part 410 surrounds the body, a relative displacement will be generated between the collision part 410 and the body no matter which portion of the collision part 410 collides with an obstacle during walking of the robot 10. Since the sensor can sense the relative displacement between the collision part 410 and the body, the robot 10 can sense the collision with the obstacle. The robot 10 can change the direction of movement to bypass the obstacle colliding therewith or take other countermeasures.

Figures 3, 4:
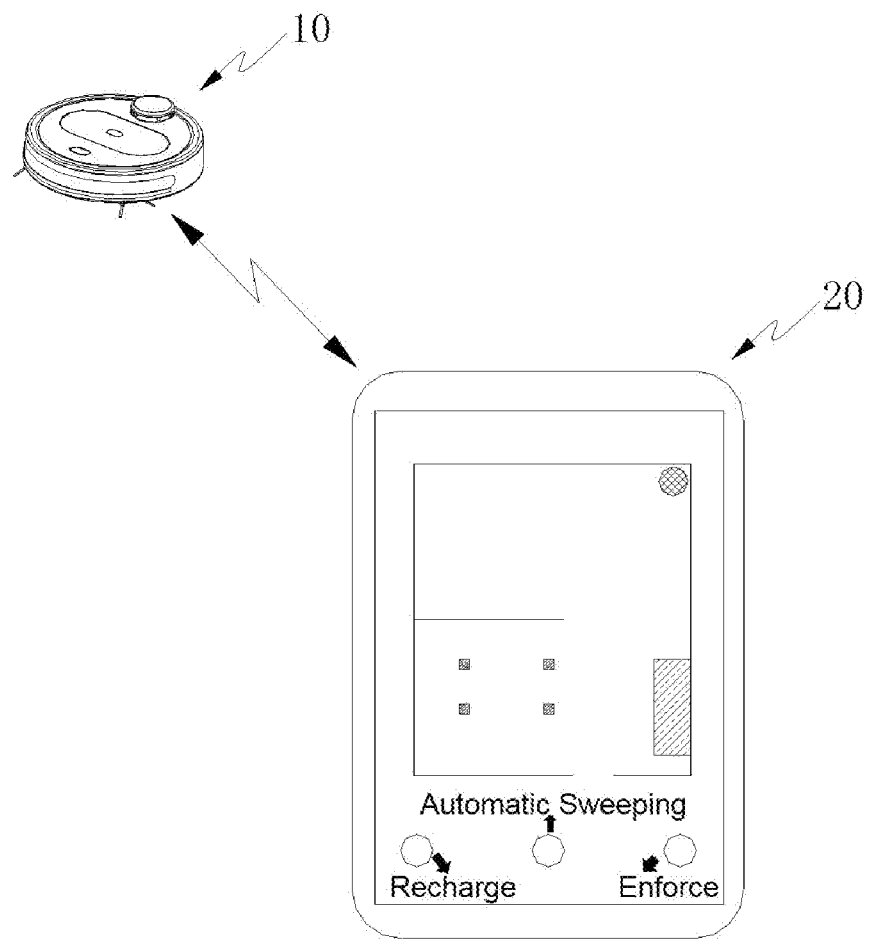
FIG. 3 is a schematic diagram of the constitution of a system for presenting a trajectory of a robot and an environmental map according to an embodiment of the present disclosure.
FIG. 4 is a schematic flow chart of a method for presenting a trajectory of a robot and an environmental map according to an embodiment of the present disclosure.

As shown in FIG. 3, an embodiment of the present disclosure provides a system for presenting a trajectory of a robot and an environmental map, the system comprises a robot 10 and a user terminal 20, and information transmission can be implemented between the robot 10 and the user terminal 20 based on a communication technology such as Wi-Fi, Zigbee, Bluetooth, a local area network, a wide area network, or the like. The user terminal 20 includes, but is not limited to, a smart phone, a tablet computer, a desktop computer, a handheld portable terminal, etc. Here, the robot 10 is configured to create environmental map data and data of trajectory of movement of the robot. In order to meet the function of the robot 10 to create environmental map data and trajectory data, the robot 10 is provided with a particular sensor, for example, in the present embodiment, a laser radar 510, also referred to as a laser scanning range finder, is protruded from the top of the robot 10; and for another example, in other embodiments, the robot 10 may also be provided with a visual sensor, which may comprise a light source emitting structured light, and an imaging device disposed at an angle with respect to the light source, etc. The robot 10 can create the environmental map data and the data of trajectory of its own movement, according to distance information measured by the specific sensor and by means of SLAM (simultaneous localization and mapping) technology. In the present embodiment, the environmental map is usually an Occupancy Grid Map.

In the present embodiment, the trajectory of movement of the robot 10 includes a real-time position and a coverage path of the robot 10, since the environmental map data is updated slower than the data of trajectory of movement of the robot 10, resources of the processor must be wasted if the real-time position and the coverage path of the robot 10 are updated together with the environmental map every time they are acquired. In order to solve this problem, the user terminal 20 is configured to acquire environmental map data and trajectory data, and display the environmental map as a background and the trajectory as a foreground on the user terminal 20, according to the environmental map data and the trajectory data, and the trajectory is refreshed at a frequency greater than that of the environmental map, thereby solving the problem that the trajectory is updated slowly and cannot be displayed in real time with a lag, thereby improving the user experience. For example, the trajectory is refreshed once approximately every 0.5 s, that is to say, the refresh frequency is approximately 2 Hz; and the environmental map is refreshed once approximately every 3 s to 5 s, that is to say, the refresh frequency is approximately 0.2 Hz to 0.3 Hz.

Specifically, in a practical application where the environmental map is used as the background and the trajectory is used as the foreground, a first depth identification information may be added to the environmental map data, and a second depth identification information may be added to the trajectory data; and the user terminal 20 displays the environmental map as the background and the trajectory as the foreground on the user terminal 20 according to the first depth identification information and the second depth identification information. In other words, when the user terminal 20 detects the first depth identification information, it is then determined that the first depth identification information is carried by the environmental map data; and when the user terminal 20 detects the second depth identification information, it is then determined that the second depth identification information is carried by the trajectory data; thus the environmental map is displayed as the background and the trajectory is displayed as the foreground on the user terminal 20 according to the determination results. A GPU of the user terminal 20 can be utilized to quickly process the view relationship between the foreground and the background, to realize a visual effect that the trajectory is raised above the environmental map.

In the practical application, due to factors such as a ranging error of the sensor, an accumulated error, and an algorithm, a boundary of the environmental map displayed on the user terminal 20 is often relatively wide, and usually has burrs and isolated points, which affect the appearance, therefore the environmental map needs to be retouched appropriately. Specifically, the user terminal 20 is configured to perform the following operation processing:

firstly, the environmental map data is decomposed into data for representing whether a region is detected, and data for representing whether it is an obstacle.

In the present embodiment, the environment map data includes, but is not limited to, data regarding that whether it is an obstacle, and data regarding that whether a region is detected. The environmental map data is decomposed in order to facilitate respective different processing of different data.

Secondly, a closing operation for dilation followed by erosion is performed to the data regarding that whether a region is detected.

In the present embodiment, the closing operation for dilation followed by erosion is used to optimize the problems of discontinuity, burrs, and isolated points of the boundary in the environmental map, so as to realize the effect of smoothing and closing the boundary. It will be easily understood that the closing operation for dilation followed by erosion may be performed multiple times as needed.

Then, a thinning operation for skeleton extraction is performed to the data regarding that whether it is an obstacle. Specifically, in the present embodiment, the data regarding that whether it is an obstacle may be first subjected to a dilation operation, and then be subjected to a thinning operation for skeleton extraction. The thinning operation for skeleton extraction may be performed by using the Zhang-Suen parallel iterative algorithm, or by using the K3M sequential iterative algorithm.

As shown in FIG. 4, an embodiment of the present disclosure further provides a method for presenting a trajectory of a robot and an environmental map, the method comprises: step S30 and step S50.

Based on the system shown in FIG. 3, in step S30, the user terminal 20 acquires environmental map data, and data of trajectory of movement of the robot 10, which are created by the robot 10; and in step S50, the environmental map is displayed as a background and the trajectory is displayed as a foreground on the user terminal 20, and the trajectory is refreshed at a frequency greater than that of the environmental map, thereby solving the problem that the trajectory is updated slowly and cannot be displayed in real time with a lag, thereby improving the user experience.

Specifically, in a practical application where the environmental map is used as the background and the trajectory is used as the foreground, the step S50 may include: adding a first depth identification information to the environmental map data, and adding a second depth identification information to the trajectory data; and displaying the environmental map as the background and the trajectory as the foreground on the user terminal according to the first depth identification information and the second depth identification information. In other words, when the user terminal 20 detects the first depth identification information, it is then determined that the first depth identification information is carried by the environmental map data; and when the user terminal 20 detects the second depth identification information, it is then determined that the second depth identification information is carried by the trajectory data; thus the environmental map is displayed as the background and the trajectory is displayed as the foreground on the user terminal 20 according to the determination results. A GPU of the user terminal 20 can be utilized to quickly process the view relationship between the foreground and the background, to realize a visual effect that the trajectory is raised above the environmental map.

Figure 5:
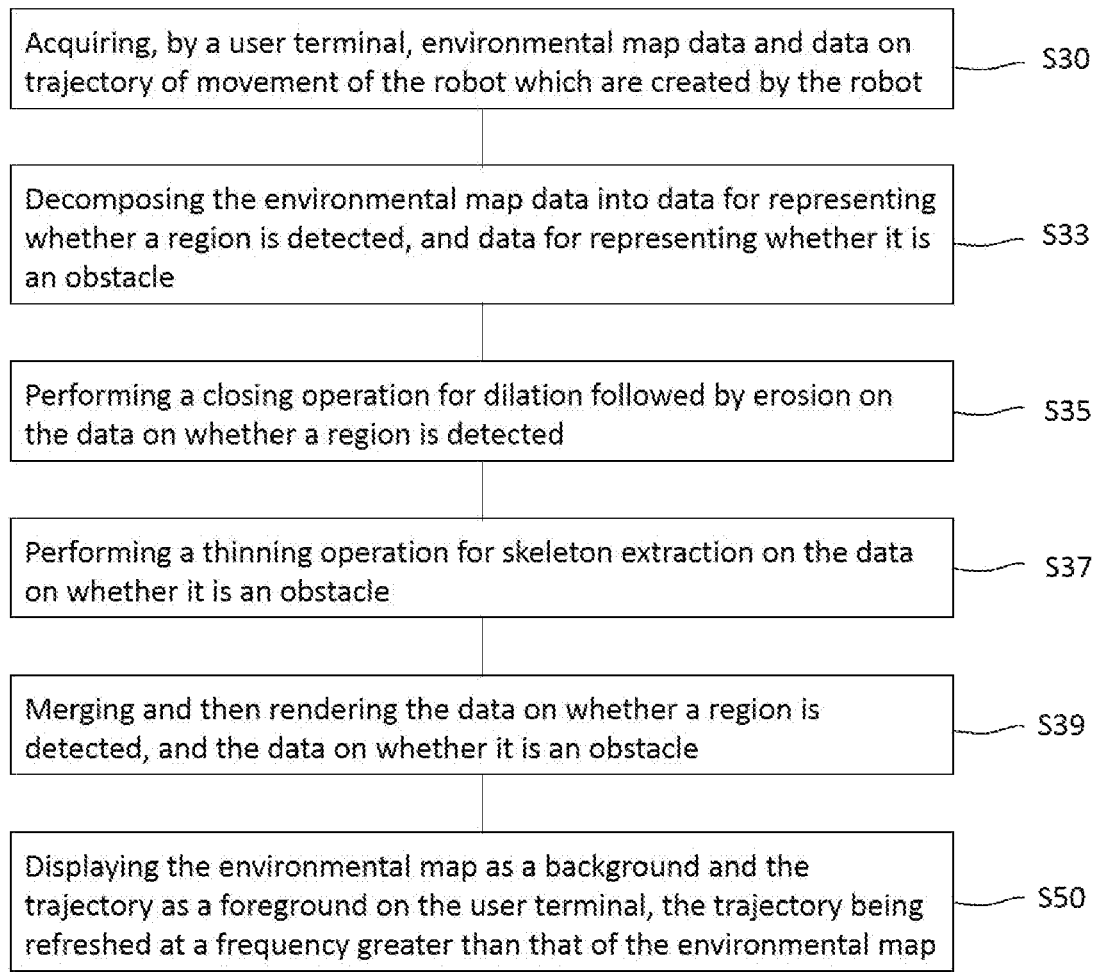
FIG. 5 is a schematic flow chart of a method for presenting a trajectory of a robot and an environmental map according to another embodiment of the present disclosure.

As shown in FIG. 5, another embodiment of the present disclosure also provides a method for presenting a trajectory of a robot and an environmental map, the method comprises: step S30, step S33, step S35, step S37, step S39, and step S50. The step S30 and step S50 have been explained and described in the foregoing embodiment, and are not described in detail herein.

In the practical application, due to factors such as a ranging error of the sensor, an accumulated error, and an algorithm, a boundary of the environmental map displayed on the user terminal 20 is often relatively wide, and usually has burrs and isolated points, which affect the appearance, therefore the environmental map needs to be retouched appropriately.

In step S33, the environmental map data is decomposed into data for representing whether a region is detected, and data for representing whether it is an obstacle.

In the present embodiment, the environment map data includes, but is not limited to, data regarding that whether it is an obstacle, and data regarding that whether a region is detected. The environmental map data is decomposed in order to facilitate respective different processing of different data.

In step S35, a closing operation for dilation followed by erosion is performed to the data regarding that whether a region is detected.

In the present embodiment, the data regarding that whether it is an obstacle may be first subjected to a dilation operation, and then be subjected to a thinning operation for skeleton extraction. The thinning operation for skeleton extraction may be performed by using the Zhang-Suen parallel iterative algorithm, or by using the K3M sequential iterative algorithm.

In step S37, a thinning operation for skeleton extraction is performed on the data on whether it is an obstacle.

In the present embodiment, the closing operation for dilation followed by erosion is used to optimize the problems of discontinuity, burrs, and isolated points of the boundary in the environmental map, so as to realize the effect of smoothing and closing the boundary. It will be easily understood that the closing operation for dilation followed by erosion may be performed multiple times as needed.

In step S39, the data regarding that whether a region is detected and the data regarding that whether it is an obstacle are merged (combined) and then are rendered.

In the present embodiment, the GPU of the user terminal 20 is invoked to render the merged data, and moreover, when the environmental map is refreshed, it only needs to clear the data regarding that whether a region is detected and the data regarding that whether it is an obstacle, and to render them again after performing the steps S33, S35, S37, and S39 in the order thereof.

The technical problem to be solved by the present disclosure is the problem in the prior art that the environmental map and the trajectory are concluded in the same one of map data such that the trajectory is updated slowly and cannot be displayed in real time, which affects the user experience.

In a method and system for presenting a trajectory of a robot and an environmental map according to the embodiments of the present disclosure, environmental map data and data of trajectory of movement of the robot which are created by the robot 10 are acquired by the user terminal 20, and further the environmental map is displayed as a background and the trajectory is displayed as a foreground on the user terminal 20, and the trajectory is refreshed at a frequency greater than that of the environmental map, thereby solving the problem that the trajectory is updated slowly and cannot be displayed in real time with a lag, thereby improving the user experience.

In the description of the specification of the present disclosure, the terms "one embodiment", "some embodiments", "an example", "a specific example", or "an alternative embodiment", etc., means that a particular feature, structure, material or characteristic described in connection with the embodiment or example is included in at least one embodiment or example of the present disclosure. In the specification of the present disclosure, the indicative representation of the above terms does not necessarily refer to the same embodiments or examples. Moreover, the description of the specific characteristic, structure, material, or feature can be merged in an appropriate manner in any one or more embodiments or examples.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

The invention claimed is:

1. A method for presenting a trajectory of a robot and an environmental map, the method comprising:
   step S30: acquiring, by a user terminal, environmental map data and data of trajectory of movement of the robot which are created by the robot; and
   step S50: displaying, on the user terminal, the environment map as a background and the trajectory as a foreground, the trajectory being refreshed at a frequency greater than that of the environment map,
   wherein after the step S30, the method further comprises:
   step S33: decomposing the environmental map data into data for representing whether a region is detected, and data for representing whether it is an obstacle;
   step S35: performing a closing operation to the data representing whether a region is detected, with a closing operation having dilation and then erosion; and
   step S37 of performing, to the data representing whether it is an obstacle, a thinning operation for skeleton extraction.

2. The method according to claim 1, wherein in the step S37, the data representing whether it is an obstacle is first subjected to a dilation operation, and then subjected to the thinning operation for skeleton extraction.

3. The method according to claim 1, wherein in the step S37, the thinning operation for skeleton extraction is performed to the data representing whether it is an obstacle, by using the Zhang-Suen algorithm.

4. The method according to claim 1, wherein after the step S37, the method further comprises step S39 of merging and then rendering the data representing whether a region is detected, and the data representing whether it is an obstacle.

5. The method according to claim 1, wherein the step S50 comprises:
   adding a first depth identification information to the environmental map data, and adding a second depth identification information to the trajectory data; and
   displaying the environmental map as the background and the trajectory as the foreground, on the user terminal, according to the first depth identification information and the second depth identification information.

6. A system for presenting a trajectory of a robot and an environmental map, comprising:
   a robot configured to create environmental map data and data on trajectory of movement of the robot; and
   a user terminal configured to acquire the environmental map data and the trajectory data and display the environment map as a background and the trajectory as a foreground, on the user terminal, according to the environmental map data and the trajectory data, the trajectory being refreshed at a frequency greater than that of the environmental map,
   wherein the user terminal is further configured to:
   decompose the environmental map data into data for representing whether a region is detected, and data for representing whether it is an obstacle;
   perform a closing operation to the data representing whether a region is detected, with closing operation having dilation and then erosion; and
   perform, to the data representing whether it is an obstacle, a thinning operation for skeleton extraction.

7. The system according to claim 6, wherein the user terminal is configured to: first perform a dilation operation and then perform the thinning operation for skeleton extraction to the data representing whether it is an obstacle.

8. The system according to claim 6, wherein the user terminal is configured to:
   add a first depth identification information to the environmental map data, and add a second depth identification information to the trajectory data; and
   display the environmental map as the background and the trajectory as the foreground, on the user terminal, according to the first depth identification information and the second depth identification information.

9. The method according to claim 2, wherein in the step S37, the thinning operation for skeleton extraction is performed to the data representing whether it is an obstacle, by using the Zhang-Suen algorithm.

* * * * *